(12) United States Patent
Münning

(10) Patent No.: US 12,358,501 B2
(45) Date of Patent: Jul. 15, 2025

(54) METHOD FOR CREATING A GUIDANCE TRAJECTORY FOR A FIRST MOTOR VEHICLE, METHOD FOR CONTROLLING A MOTOR VEHICLE AND METHOD FOR OPERATING A MOTOR VEHICLE

(71) Applicant: VOLKSWAGEN AKTIENGESELLSCHAFT, Wolfsburg (DE)

(72) Inventor: Daniel Münning, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 108 days.

(21) Appl. No.: 18/554,567

(22) PCT Filed: Apr. 5, 2022

(86) PCT No.: PCT/EP2022/058930
§ 371 (c)(1),
(2) Date: Oct. 9, 2023

(87) PCT Pub. No.: WO2022/214451
PCT Pub. Date: Oct. 13, 2022

(65) Prior Publication Data
US 2024/0182027 A1 Jun. 6, 2024

(30) Foreign Application Priority Data
Apr. 8, 2021 (DE) ...................... 10 2021 203 484.5

(51) Int. Cl.
*B60W 30/12* (2020.01)
*B60W 60/00* (2020.01)
(Continued)

(52) U.S. Cl.
CPC .......... *B60W 30/12* (2013.01); *B60W 60/001* (2020.02); *G06V 20/588* (2022.01);
(Continued)

(58) Field of Classification Search
CPC ............... B60W 30/12; B60W 60/001; B60W 2420/403; B60W 2530/201;
(Continued)

(56) References Cited

U.S. PATENT DOCUMENTS 10,814,872 B2 10/2020 Sofra et al.
11,493,597 B2 11/2022 Bruns et al.
(Continued)

FOREIGN PATENT DOCUMENTS

CN 106494392 A * 3/2017 ............ B60W 10/04
DE 102014002113 A1 8/2015
(Continued)

OTHER PUBLICATIONS

Machine Translation of WO 2017190973 A1 PDF File Name: "WO2017190973A1_Machine_Translation.pdf" (Year: 2017).*
(Continued)

*Primary Examiner* — Lindsay M Low
*Assistant Examiner* — Ruben Picon-Feliciano
(74) *Attorney, Agent, or Firm* — BARNES & THORNBURG LLP

(57) ABSTRACT

A method for creating a guidance trajectory for a first transportation vehicle which includes receiving swarm data for a route section that represent at least one motion trajectory of at least one second transportation vehicle traveling through this route section; determining a distance from the at least one motion trajectory represented by the swarm data to a determined roadway edge for the route section; and using an electronic computing device to apply the at least one motion trajectory to ascertain the guidance trajectory for the first transportation vehicle in response to the distance associated with the respective motion trajectory being greater than or equal to a predefined limit value for the route section, and to provide the guidance trajectory for the first (Continued)

transportation vehicle, as a result of which the first transportation vehicle is transversely controlled using the guidance trajectory.

13 Claims, 1 Drawing Sheet

(51) Int. Cl.
G06V 20/56 (2022.01)
H04W 4/46 (2018.01)

(52) U.S. Cl.
CPC ........ *H04W 4/46* (2018.02); *B60W 2420/403* (2013.01); *B60W 2530/201* (2020.02); *B60W 2552/53* (2020.02); *B60W 2554/408* (2020.02); *B60W 2556/65* (2020.02)

(58) Field of Classification Search
CPC ....... B60W 2552/53; B60W 2554/408; B60W 2556/65; B60W 2554/801; B60W 2556/10; B60W 30/10; G06V 20/588; H04W 4/46
See application file for complete search history.

(56) References Cited

U.S. PATENT DOCUMENTS

| | | | | |
|---|---|---|---|---|
| 2015/0177007 A1* | 6/2015 | Su | ........................ | G05D 1/0246 |
| | | | | 701/25 |
| 2019/0179337 A1 | 6/2019 | Ji | | |
| 2019/0346845 A1 | 11/2019 | Rottkamp | | |
| 2021/0129844 A1* | 5/2021 | George | ............... | B60W 30/165 |
| 2022/0204048 A1 | 6/2022 | Klomp et al. | | |

FOREIGN PATENT DOCUMENTS

| | | | | |
|---|---|---|---|---|
| DE | 102016007571 A1 | 2/2017 | | |
| DE | 102015014651 A1 | 5/2017 | | |
| DE | 102016222782 A1 | 5/2018 | | |
| DE | 102017212361 A1 | 1/2019 | | |
| DE | 102016201667 B4 * | 6/2019 | ............. | G01C 21/26 |
| DE | 102018205322 A1 | 10/2019 | | |
| DE | 102018221264 A1 | 6/2020 | | |
| DE | 102020001578 A1 | 10/2020 | | |
| DE | 102019206562 A1 | 11/2020 | | |
| WO | WO-2017190973 A1 * | 11/2017 | ....... | G08G 1/096716 |
| WO | 2020104076 A1 | 5/2020 | | |

OTHER PUBLICATIONS

Machine Translation of DE 102016201667 B4 PDF File Name:"DE102016201667B4_Machine_Translation.pdf" (Year: 2019).*
Machine Translation of CN 106494392 A PDF File Name: "CN 106494392A_Machine_Translation.pdf" (Year: 2017).*
International Search Report; International Patent Application No. PCT/EP2022/058930; Aug. 1, 2022.

* cited by examiner

METHOD FOR CREATING A GUIDANCE TRAJECTORY FOR A FIRST MOTOR VEHICLE, METHOD FOR CONTROLLING A MOTOR VEHICLE AND METHOD FOR OPERATING A MOTOR VEHICLE

PRIORITY CLAIM

This patent application is a U.S. National Phase of International Patent Application No. PCT/EP2022/058930, filed 5 Apr. 2022, which claims priority to German Patent Application No. 10 2021 203 484.5, filed 8 Apr. 2021, the disclosures of which are incorporated herein by reference in their entireties.

SUMMARY

Illustrative embodiments relate to a method for creating a guidance trajectory for a first transportation vehicle, a method for controlling a transportation vehicle and a method for operating a transportation vehicle.

BRIEF DESCRIPTION OF THE DRAWINGS

Disclosed embodiments will be described in more detail below with reference to the drawings. The features and feature combinations are usable not only in the respectively indicated combinations, but also in other combinations or in isolation without departing the scope of the invention.

DETAILED DESCRIPTION

Figure 1:
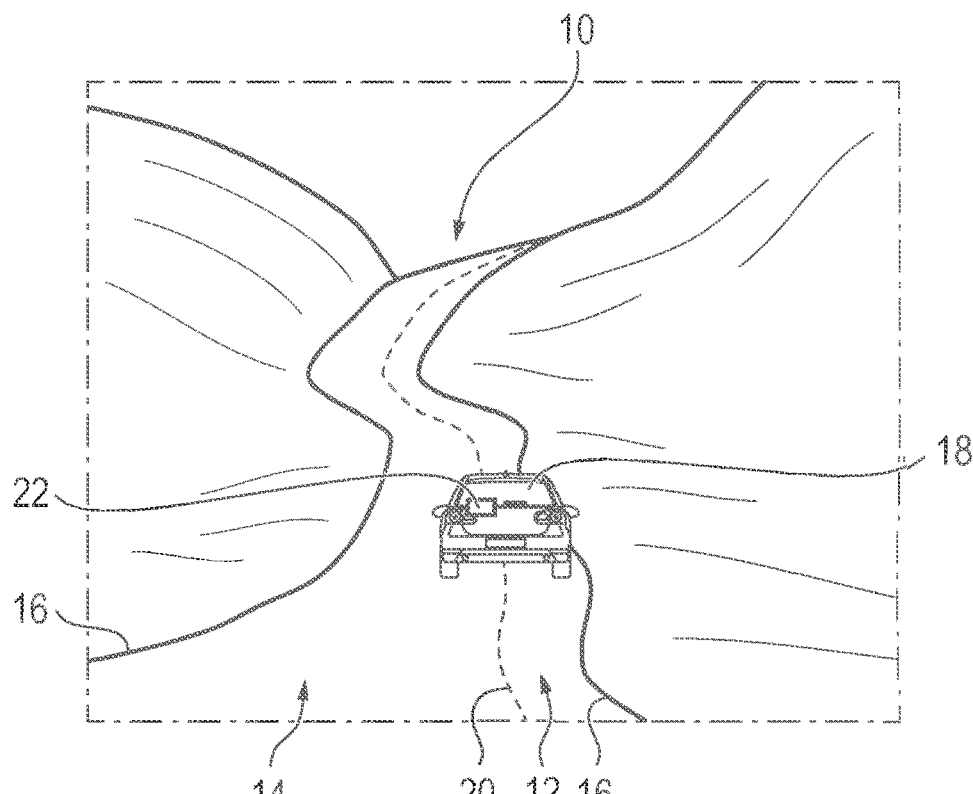
FIG. 1 shows a perspective view of a road having two roadways with opposite directions of travel, wherein a transportation vehicle is disposed on the road, the transportation vehicle being transversely controlled along a guidance trajectory on the road.

During an operation of a transportation vehicle by transversely guiding driver assistance systems, it is to be provided that no lines identified by a camera device of the transportation vehicle as a traffic lane demarcation are actively driven over. Particularly in situations in which only one side of a traffic lane is demarcated by a line or the line demarcating the traffic lane is detected by the camera device on one side of the traffic lane only, a reliable guidance of the transportation vehicle on the traffic lane without driving over the line demarcating the traffic lane is desired.

A method for operating a safety system of a transportation vehicle is known from DE 10 2014 002 113 A1, wherein at least one hazard value is determined from environment data describing an environment of the transportation vehicle and from ego data relating to the transportation vehicle. If at least one action criterion for the hazard value is satisfied, warning information is output to the driver and/or at least one measure, in particular, a driving intervention, is carried out to increase the safety of the transportation vehicle. Convoy lane information which describes the convoy behavior of a convoy of further transportation vehicles driving in front of the transportation vehicle and which is determined from the environment data is taken into account in determining the hazard value.

A method for identifying a malfunction of at least one environment sensor of a transportation vehicle is further known from DE 10 2018 205 322 A1. The at least one environment sensor is operated here while the transportation vehicle passes a predetermined gate area of a road network. Respective detection data are determined on the basis of respective sensor data of the at least one environment sensor. The respective detection data in each case describe the at least one object which has been identified in the gate area on the basis of the sensor data of the respective environment sensor. Reference data which describe at least one object actually present in the gate area are provided in the transportation vehicle. A deviation of the respective detection data from the reference data is determined and, if the deviation satisfies a predetermined indicator criterion, an entry relating to the malfunction of the environment sensor is stored for the respective environment sensor, the detection data of which satisfy the indicator criterion.

The disclosed embodiments provide a solution which enables a reliable control of a transportation vehicle on a traffic lane with only a single identified traffic lane demarcation without the transportation vehicle driving over the identified traffic lane demarcation.

The disclosed embodiments relate to a method for creating a guidance trajectory for a first transportation vehicle. In the method, it is provided in a first method operation that swarm data are received for a route section, wherein the swarm data represent at least one motion trajectory of at least one second transportation vehicle travelling through this route section. In the method, the at least one motion trajectory of the at least one second transportation vehicle is therefore considered for the route section. The motion trajectory thus describes, for example, a motion characteristic of a center point of the second transportation vehicle in the route section and therefore characterizes a plurality of positions which have been driven over by the second transportation vehicle, in particular, by the center point of the second transportation vehicle, in the route section. In a second method operation of the method, it is provided that a distance between the at least one motion trajectory represented by the swarm data and the determined roadway edge is determined for the route section. In particular, the roadway edge or a position of the roadway edge relative to the respective positions of the second transportation vehicle represented by the motion trajectory are determined in the route section by a determined roadway marking. A characteristic of the at least one motion trajectory in relation to the roadway marking is then determined and respective shortest distances between the motion trajectory and the roadway edge, in particular, the roadway marking, are determined. These respective shortest distances between the motion trajectory and the roadway edge represent a lateral distance between the motion trajectory and the roadway edge. In a third method operation of the method, it is provided that the at least one motion trajectory is used by an electronic computing unit for determining the guidance trajectory for the first transportation vehicle, insofar as the distance assigned to the respective motion trajectory for the route section is greater than or equal to a predefined limit value. It is further provided that the guidance trajectory for the first transportation vehicle is provided by the electronic computing device, as a result of which the first transportation vehicle can be transversely controlled using the guidance trajectory. Only the motion trajectories of the swarm data for which the determined distance for the route section is greater than or equal to the predefined limit value are therefore used by the electronic computing device for determining the guidance trajectory. In particular, only the respective shortest distance between the respective motion trajectories and the determined roadway edge over the entire route section is used here. In other words, the respective motion trajectory of the swarm data is used to determine the guidance trajectory only if the distance between the motion trajectory and the determined roadway edge in the entire route section is greater than or equal to the predefined limit value. If the determined distance between one of the motion trajectories of the swarm data and the determined roadway edge is less than the predefined limit value at least at one point of the route section, this motion trajectory is not used to determine the guidance trajectory. As a result, it is at least essentially possible for the first transportation vehicle to avoid driving over the roadway edge in the route section when the first transportation vehicle is controlled using the guidance trajectory.

It is possible to determine by the distance whether the transportation vehicle providing the motion trajectory has driven over the determined roadway edge, or has at least come closer to the determined roadway edge than the predefined limit distance. If it is therefore determined using the method that the transportation vehicle has come closer to the roadway edge than predefined by the predefined limit, the motion trajectory assigned to this second transportation vehicle is not used to determine the guidance trajectory. Conversely, if it is determined that the motion trajectory of the second transportation vehicle is further distanced from the determined roadway edge than the predefined limit value in the entire route section under consideration, this motion trajectory assigned to the second transportation vehicle is used to determine the guidance trajectory. This method enables the guidance trajectory to be determined for the first transportation vehicle by the swarm data, as a result of which the first transportation vehicle can be reliably controlled even if only one single roadway marking demarcating the roadway is identified and, in addition, a risk of driving over the roadway edge by the first transportation vehicle that is transversely guided depending on the guidance trajectory is kept particularly low.

In a further exemplary embodiment, it is provided that the limit value is determined depending on a vehicle width of the second transportation vehicle. This means that, for each second transportation vehicle, a respective individual limit value can be predefined depending on the respective transportation vehicle width of the second transportation vehicle. This limit value can be determined, for example, by the second transportation vehicle. On the basis of the distance between the motion trajectory and the determined roadway edge and the determined vehicle width of the second transportation vehicle, it can be established how far an outermost edge of the second transportation vehicle is distanced from the roadway edge, or whether the second transportation vehicle has driven over the roadway edge. A tolerance for an approach of the second transportation vehicle to the roadway edge can thus be predefined on the basis of the limit value. The limit value defines how far the second transportation vehicle is allowed to approach the roadway edge while the assigned motion trajectory for the route section is still used to determine the guidance trajectory, and when the second transportation vehicle is disposed too close to the roadway edge in the route section, and therefore the assigned motion trajectory is not used to determine the guidance trajectory. By determining the limit value depending on the vehicle width, the vehicle width can therefore also be used in deciding whether the motion trajectory for the route section is also used to determine the guidance trajectory.

In a further exemplary embodiment, it is provided that the swarm data for the route section are received by the electronic computing device and the motion trajectories for which the distance is less than the predefined limit value are discarded. In other words, the swarm data are processed by the electronic computing device and are presorted. In the method, all swarm data are therefore made available to the electronic computing device which checks the respective motion trajectories of the swarm data by the predefined limit value. The guidance trajectory is then determined for the first transportation vehicle, wherein motion trajectories are not used to determine the guidance trajectory for which it has been determined that the distance is less than the predefined limit value. All motion trajectories can thus be checked in a reproducible and comparable manner by the electronic computing device. The guidance trajectory can be, for example, by averaging the motion trajectories used to determine the guidance trajectory. To do this, the motion trajectories can be assigned to one another in a location-related manner and the guidance trajectory can then be determined for respective length areas of the route section by averaging the motion trajectories. The entire guidance trajectory for the route section is obtained by joining together the respective guidance trajectories determined for the length areas of the route section.

In a further exemplary embodiment, it is provided that the electronic computing device receives the route of the vehicle center of the second transportation vehicle to the determined roadway edge and a vehicle width of the second transportation vehicle from the at least one second transportation vehicle in addition to the respective motion trajectory. Here, the electronic computing device is not part of the second transportation vehicle. The electronic computing device can further determine the limit value individually for the respective second transportation vehicle or for the respective motion trajectory depending on the vehicle width. The distance and from it a distance between the second transportation vehicle and the determined roadway edge can be determined by the electronic computing device from a respectively received route of the vehicle center of the second transportation vehicle along the motion trajectory to the determined roadway edge and from the received vehicle width of the respective second transportation vehicle along the entire motion trajectory in the route section. Not only can the limit value thus be determined by the electronic computing device for every second transportation vehicle depending on the respective vehicle width of the second transportation vehicle, but also the respective motion trajectory provided by the second transportation vehicle can be checked by the electronic computing device for adherence to the limit value in the route section depending on the determined limit value.

It is provided in a further exemplary embodiment that the received motion trajectories are classified by the electronic computing device depending on a vehicle width of the second transportation vehicle which provides the motion trajectory, the vehicle width being assigned to the respective motion trajectory. Respective motion trajectories of transportation vehicles which have an at least essentially identical vehicle width can thus be combined into common groups. As a result, respective motion trajectories of second transportation vehicles having an at least essentially identical vehicle width can be jointly checked or evaluated and assessed in a particularly simple manner. As a result, for example, an identical limit value can be predefined for all motion trajectories of a common group. This enables a particularly simple determination and provision of the limit value.

In this connection, it can be provided in a further exemplary embodiment that the guidance trajectory is determined by the electronic computing device depending on at least one motion trajectory which is assigned to the same classification as the vehicle width of the first transportation vehicle. In other words, the electronic computing device can receive the vehicle width of the first transportation vehicle requesting the guidance trajectory. Depending on the received vehicle width, the electronic computing device selects the group of motion trajectories which are grouped together on the basis of a vehicle width or a range of vehicle widths and which are assigned to the received vehicle width of the first transportation vehicle. As a result, a complex conversion of vehicle widths to avoid driving over the roadway edge can be dispensed with, since only the motion trajectories which have been received from second transportation vehicles having identical or at least similar vehicle widths as the vehicle width of the first transportation vehicle are used to determine the guidance trajectory.

In a further exemplary embodiment, it is provided that the guidance trajectory is adapted depending on the vehicle width of the first transportation vehicle. The guidance trajectory can be adapted by the electronic computing device or by the first transportation vehicle depending on the determined vehicle width of the first transportation vehicle. The guidance trajectory can be adapted depending on a comparison between the vehicle width of the first transportation vehicle and respective vehicle widths of the second transportation vehicles, the motion trajectories of which have been used to determine the guidance trajectory. A conversion of the determined guidance trajectory from the vehicle widths of the second transportation vehicles providing the motion trajectories to the vehicle width of the first transportation vehicle can thus be performed. As a result, a particularly large number of motion trajectories of different second transportation vehicles can be used to determine the guidance trajectory. An elimination of respective motion trajectories of second transportation vehicles on the basis of the respective vehicle width of the second transportation vehicle and therefore a forbearance of the use of the respective motion trajectories on the basis of the vehicle width of the assigned second transportation vehicle can thus be omitted. As a result, a particularly large data repository of swarm data can be provided for determining the guidance trajectory, as a result of which the guidance trajectory can be determined with particularly high precision.

In a further exemplary embodiment, it is provided that the guidance trajectory is determined from the at least one motion trajectory by an electronic computing device superordinated to the first transportation vehicle and to the at least one second transportation vehicle. The electronic computing device is therefore, in particular, a computing device, such as a server device, superordinated to the transportation vehicles. This server device can be a backend. As a result, large data volumes can be processed in stationary servers and respective computing powers of electronic computing devices of the transportation vehicles can be kept particularly low. The execution of respective method operations in the electronic computing device ensures a uniform evaluation of the respective motion trajectories.

In a further exemplary embodiment, it is provided that the motion trajectory is made available for the electronic computing device by the at least one second transportation vehicle for the route section if the distance is greater than or equal to the predefined limit value. It is further provided that the motion trajectory for the route section is not provided by the at least one second transportation vehicle for the electronic computing device if the distance is less than the predefined limit value. This means that the respective second transportation vehicles themselves carry out an evaluation of the respective motion trajectories and provide the electronic computing device with only the motion trajectories for which the distance between the motion trajectory and the determined roadway edge is greater than or equal to the predefined limit value over the entire route section. The motion trajectories are therefore already presorted in the second transportation vehicles that create or provide the motion trajectories. As a result, the quantity of swarm data that are transmitted from the second transportation vehicles to the electronic computing device can be kept particularly low. This is implemented, in particular, by providing the electronic computing device with only the motion trajectories which can potentially be used for determining the guidance trajectory on the basis of the determined distance to the determined roadway edge in the respective route section. The transmission from the respective second transportation vehicles to the electronic computing device of the motion trajectories for which the determined distance to the determined roadway edge in the route section is less than the predefined limit value is thus avoided, as a result of which a transmission of unnecessary data from the second transportation vehicles to the electronic computing device, here the motion trajectories not to be used for determining the guidance trajectory, can be dispensed with.

In a further exemplary embodiment, it can be provided that the at least one second transportation vehicle comprises a camera device by which the roadway edge and the distance can be determined. The roadway edge can be determined here by the camera device on the basis of a roadway marking determined by image data recorded by the camera device. In particular, a position of the roadway edge relative to a vehicle center of the second transportation vehicle can be determined here. The camera device enables a particularly simple and reliable determination of a roadway edge for the route section. For this purpose, in particular, it is not necessary for the route section to be already known to the second transportation vehicle. The method can thus be used for route sections hitherto unknown to the second transportation vehicle due to the use of the camera device.

The disclosed embodiments further relate to a method for controlling a first transportation vehicle, in which a guidance trajectory is received by a control device from an electronic computing device, the guidance trajectory having been created in a method as already described in connection with the disclosed method for creating the guidance trajectory for the first transportation vehicle. It is further provided in the method that the first transportation vehicle is guided along the guidance trajectory by the control device. The control device is configured, in particular, to control the first transportation vehicle transversely, in an at least partially automated, in particular fully automated manner, whereby the first transportation vehicle can be kept reliably on the guidance trajectory when driving through respective route sections. As a result, driving over a roadway edge by the first transportation vehicle guided by the control device can at least essentially be avoided.

In a further exemplary embodiment, it is provided that a distance between the guidance trajectory and a determined roadway edge is determined by the control device, and, if the distance falls below a threshold value, the guidance trajectory is shifted by a predefined value. The control device can receive roadway edge data characterizing the roadway edge or a position of the guidance trajectory relative to the roadway edge and can determine the distance depending on the received roadway edge data. Alternatively, the control device can be configured to determine the distance depending on sensor data which are received by a sensor device of the first transportation vehicle and which characterize the roadway edge. The value by which the guidance trajectory is shifted if the distance falls below the threshold value can be what is known as an offset. This shift of the guidance trajectory by the predefined value if the distance falls below the threshold value ensures that the first transportation vehicle guided along the guidance trajectory at least essentially does not drive over the determined roadway edge and does not therefore leave the roadway. As a result, an accident risk or a risk of collision of the first transportation vehicle with objects outside the roadway can be kept particularly low.

In a further exemplary embodiment, it can be provided here, in particular, that the predefined value is determined by the control device depending on a difference between a vehicle width of the first transportation vehicle and a vehicle width of the at least one second transportation vehicle, the motion trajectory of which has been used to determine the guidance trajectory. In other words, the guidance trajectory can be corrected by the control device depending on the difference between the vehicle width of the first transportation vehicle and the vehicle width of the at least one second transportation vehicle, the motion trajectory of which has been used to determine the guidance trajectory. The guidance trajectory is therefore converted to the vehicle width of the first transportation vehicle. If the vehicle widths of the first transportation vehicle and the second transportation vehicle are different, particularly if the first transportation vehicle is wider than the second transportation vehicles, the motion trajectories of which have been used to determine the guidance trajectory, the wider first transportation vehicle can thus be prevented from driving off the roadway by driving over the roadway edge while being guided along the guidance trajectory. The correction of the guidance trajectory by the control device depending on the difference between the vehicle width of the first transportation vehicle and the vehicle width of the respective second transportation vehicles, the motion trajectories of which have been used for determining the guidance trajectory, enables the motion trajectories of a particularly large number of second transportation vehicles having different vehicle widths to be used to determine the guidance trajectory, as a result of which the guidance trajectory can be determined with particularly high precision. This guidance trajectory can in turn be used in first transportation vehicles having the widest variety of vehicle widths for a respective control of the first transportation vehicles. This determined guidance trajectory is therefore particularly universally usable through adaptation of the guidance trajectory to the vehicle width of the respective first transportation vehicle by the respective control device of the respective first transportation vehicle using the guidance trajectory.

In a further exemplary embodiment, it is provided that the guidance trajectory is shifted away from the roadway edge, in particular, an outer roadway edge, by a predefined value. This means that the guidance trajectory is shifted by the predefined value in the direction of a center of the road as soon as the determined distance falls below the predefined threshold value. As a result, a risk of driving over the outer roadway edge by the first transportation vehicle during the guidance of the first transportation vehicle along the guidance trajectory can be kept particularly low.

The disclosed embodiments further relate to a method for operating a transportation vehicle in which the distance between a motion trajectory of the transportation vehicle and a roadway edge is determined for a route section. In the method, it is further provided that, if the distance is established as greater than or equal to a predefined limit value for a route section, the motion trajectory for the route section is provided for an electronic computing device. This electronic computing device is configured to determine a guidance trajectory for a further transportation vehicle depending on the motion trajectory. On the basis of a respective point on the motion trajectory, the shortest distance between this point and the determined roadway edge is used to determine the distance between the motion trajectory of the transportation vehicle and the roadway edge. As a result, a lateral distance between the motion trajectory and the roadway edge can be determined over the entire route section. If it is established for at least one area of the route section that the determined distance between the motion trajectory and a determined roadway edge is less than the predefined limit value, the motion trajectory is not provided for the electronic computing device for the road section. In particular, this motion trajectory can be discarded. Only the motion trajectories for the route section for which the distance between the motion trajectory and the roadway edge is greater than or equal to the predefined limit value over the entire route section are therefore provided by the transportation vehicle for the electronic computing device. For this purpose, in particular, a shortest distance between the motion trajectory and the determined roadway edge in the entire route section can be used for the consideration. If this shortest determined distance is greater than or equal to the predefined limit value, this motion trajectory is provided for the electronic computing device. If it is determined that this shortest distance falls below the predefined limit value, the motion trajectory is not provided for the electronic computing device. Motion trajectories are therefore presorted in the transportation vehicle. This ensures that only the motion trajectories which can be further used by the electronic computing device to determine the guidance trajectory for the further transportation vehicle are provided by the transportation vehicle for the electronic computing device. The electronic computing device for which the transportation vehicle can provide the at least one motion trajectory is configured, in particular, to carry out the method which has been described in connection with the disclosed method for creating the guidance trajectory for the first transportation vehicle. Positive developments of the disclosed method for creating a guidance trajectory for a first transportation vehicle are to be regarded as positive developments of the method for controlling a first transportation vehicle and of the method for operating a transportation vehicle, and vice versa.

FIG. 1 shows a perspective view of a road 10, wherein the road 10 has a first roadway 12 having a first direction of travel, and a second roadway 14 having a second direction of travel counter-directional to the first direction of travel. The respective roadways 12, 14 are in each case demarcated outwardly and away from the respective other roadway 12, 14 by a roadway marking 16. A central line visually separating the roadways 12, 14 from one another is not present here. A first transportation vehicle 18 which is transversely controlled in an at least partially automated manner along a guidance trajectory 20 is disposed on the first roadway 12. The first transportation vehicle 18 can have a control device 22 indicated schematically by a box in FIG. 1, by which the first transportation vehicle 18 can be transversely controlled in an at least partially automated, in particular, fully automated manner using the guidance trajectory 20.

Figure 2:
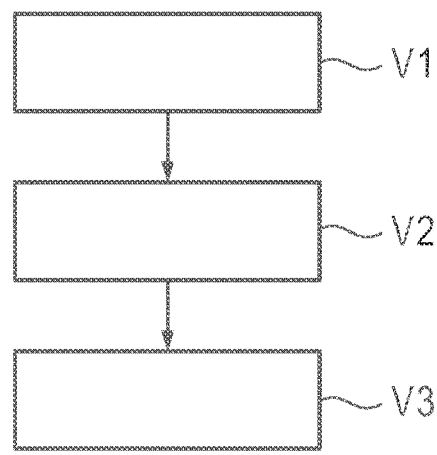
FIG. 2 shows a process diagram of a method for creating a guidance trajectory for a first transportation vehicle, here the transportation vehicle in FIG. 1, wherein at least one motion trajectory of at least one second transportation vehicle is used to create the guidance trajectory, wherein this motion trajectory is used to determine the guidance trajectory only if a determined distance from the at least one motion trajectory to a determined roadway edge is greater than or equal to a predefined limit value.

The guidance of the first transportation vehicle 18 along the guidance trajectory 20 enables the transportation vehicle 18 to be guided reliably on the first roadway 12 despite the missing central line, wherein a risk of the first transportation vehicle 18 swerving onto the second roadway 14 can be kept particularly low. For this purpose, it is provided that the guidance trajectory 20 is determined from swarm data, wherein the swarm data comprise at least one motion trajectory of at least one second transportation vehicle for a route section on which the first transportation vehicle 18 is located. To avoid driving over the outer roadway marking 16 by the first transportation vehicle 18 during a guidance of the first transportation vehicle 18 along the guidance trajectory 20, for example, as a consequence of different transportation vehicle widths of the first transportation vehicle 18 and the second transportation vehicle providing the at least one motion trajectory, or a swerving of the second transportation vehicle providing the motion trajectory, a method is provided for creating the guidance trajectory 20 for the first transportation vehicle 18, the process diagram of which is shown in FIG. 2. At least the first method operation at V1 and the third method operation at V3 of the method are carried out by an electronic computing device superordinated to the transportation vehicles, here a server device. The second method operation at V2 can similarly be carried out by the electronic computing device. Alternatively, the second method operation at V2 can be carried out by the respective second transportation vehicle providing the motion trajectory, in particular, temporally before the first method operation at V1 is carried out.

In the first method operation at V1, a motion trajectory which represents a motion of the second transportation vehicle through a defined route section is received by the electronic computing device from at least one second transportation vehicle. In particular, respective motion trajectories for the route section are received by the electronic computing device as swarm data from a plurality of second transportation vehicles. The received motion trajectories can be divided here into respective groups by the electronic computing device, wherein respective motion trajectories of a common group have been received from second transportation vehicles which have at least essentially the same vehicle width or a vehicle width within a vehicle width range predefined for the respective group.

In the second method operation at V2, it is provided that the distance, in particular, the shortest distance, between the motion trajectory and the outer roadway edge, which is characterized here by the respective roadway markings 16, is investigated for the route section. In the investigation, it is determined whether the distance between the respective motion trajectory and the roadway edge falls below a predefined limit value in the route section. This limit value can be predefined generally or can be determined depending on a vehicle width of the respective second transportation vehicle providing the motion trajectory, and can be used to check the assigned motion trajectory. If it is established that the distance between the motion trajectory and the roadway edge falls below the predefined limit value in the route section, this movement trajectory is not used to determine the guidance trajectory 20. Conversely, if it is determined in the investigation that the distance between the motion trajectory and the roadway edge is greater than or equal to the predefined limit value in the entire route section, this motion trajectory can be used to determine the guidance trajectory 20. If the second method operation at V2 is carried out by the respective second transportation vehicles capturing the motion trajectories, the respective transportation vehicle can provide the respective motion trajectory for the route section for the electronic computing device depending on the result of the check, or can prevent the provision of the motion trajectory for the electronic computing device, in particular, can discard the respective motion trajectory. In other words, the respective second transportation vehicle provides the motion trajectory for the electronic computing device only if it has been determined in the second transportation vehicle that the distance between the motion trajectory and the outer roadway edge is greater than or equal to the predefined limit value in the entire route section. The limit value can be determined here, in particular, by the second transportation vehicle itself.

Alternatively or additionally, the second method operation at V2 can be carried out by the electronic computing device. Here, the electronic computing device determines the distance between the respective motion trajectories and the determined roadway edge for respective motion trajectories receiving for the route section. The electronic computing device further evaluates the determined distance in terms of the limit value predefined for the respective motion trajectory. The motion trajectories for which the determined distance is less than the respective assigned predefined limit value can then be discarded by the electronic computing device. The electronic computing device can receive the predefined limit value from the respective transportation vehicles providing the motion trajectories or can itself determine the limit value for the respective motion trajectories. The electronic computing device can receive the respective vehicle width of the second transportation vehicle in addition to the respective motion trajectory from the respective second transportation vehicles to determine the respective limit values for the motion trajectories. The electronic computing device can receive a route of a vehicle center of the second transportation vehicle to the determined roadway edge and therefore a position of the respective motion trajectories relative to the determined roadway edge from the respective second transportation vehicles in addition to the motion trajectory to determine the distance. The distance between the motion trajectory and the determined roadway edge can be determined by the electronic computing device over the entire route section by the position of the respective motion trajectory relative to the determined roadway edge.

In a third method operation at V3, it is provided that the guidance trajectory 20 is determined by the electronic computing device depending on the at least one motion trajectory for the route section received by the electronic computing device. Only such motion trajectories for which it has been established for the route section that the motion trajectory has a distance continuously through to the roadway edge that is greater than or equal to the assigned predefined limit value are used to determine the guidance trajectory 20. The guidance trajectory 20 is then provided by the electronic computing device for the first transportation vehicle 18, as a result of which the first transportation vehicle 18 can be transversely controlled in an at least partially automated manner along the guidance trajectory 20.

To ensure that the guidance trajectory 20 is particularly well adapted to the first transportation vehicle 18, it can be provided that the vehicle width of the first transportation vehicle 18 is determined by the electronic computing device and only motion trajectories of a group to which the vehicle width of the first transportation vehicle 18 can be assigned are used to determine the guidance trajectory 20. Alternatively or additionally, the guidance trajectory 20 can be created by the electronic computing device and can then be adapted depending on the determined vehicle width of the first transportation vehicle 18.

The control device 22 can be configured to determine a distance between the guidance trajectory 20 and the outer roadway edge. For this purpose, the control device 22 can receive sensor data from a sensor device of the first transportation vehicle 18, in particular, image data from a camera device, and can determine a position or a course of the guidance trajectory 20 relative to the determined roadway edge. Here, the control device 22 can determine a distance between the guidance trajectory 20 and the roadway edge. If it is established by the control device 22 that the determined distance falls below a predefined threshold value, the guidance trajectory 20 can be shifted by a predefined value, in particular, in the direction of a center of the road 10 and therefore away from the outer roadway edge. The value can be predefined here by the control device 22 depending on a difference between the determined distance and the predefined threshold value. Alternatively or additionally, the predefined value can be determined by the control device 22 depending on a difference between a vehicle width of the first transportation vehicle 18 and a vehicle width of the at least one second transportation vehicle, the motion trajectory of which has been used to determine the guidance trajectory 20.

The at least one second transportation vehicle can have a camera device to enable a determination of the roadway edge of the route section and a determination of a respective course of the respective motion trajectory relative to the roadway edge. A distance between the motion trajectory and the roadway edge can be determined by this camera device using an image recognition method for each position of the second transportation vehicle along with the motion trajectory. The camera can comprise an artificial intelligence to carry out this image recognition method. The distance to the roadway marking 16 can be determined and stored as assigned to the motion trajectory by the camera device of the second transportation vehicle for at least one position of the second transportation vehicle on the motion trajectory. This determined distance can be used in the second transportation vehicle and/or in the electronic computing device to check the respective motion trajectory.

A lane detection and consequently a determination of the respective roadway edge can be carried out depending on a distance between respective roadway markings 16 outwardly demarcating the road 10. It is possible for the respective second transportation vehicle or the first transportation vehicle 18 or the electronic computing device to detect how many traffic lanes the road 10 has, depending on the determined distance between the roadway markings 16.

Motion trajectories used to determine the guidance trajectory 20 can be averaged to determine the guidance trajectory 20. Outliers of the motion trajectories can be corrected.

The described embodiments are based on the knowledge that swarm data can be used to be able to control a respective transportation vehicle, here the first transportation vehicle 18, in an at least partially automated manner in situations with only one line demarcating the respective traffic lane. Two lines demarcating the traffic lane on the respective sides are often necessary for a transverse control of a transportation vehicle. The guidance trajectory 20 can be used to mirror the determined roadway marking 16 thereon, as a result of which the first transportation vehicle 18 can be transversely controlled between the determined roadway marking 16 and the mirrored roadway marking by the control device 22.

When the swarm data are generated, it can occur that one of the second transportation vehicles is driven manually by the driver and the outer roadway marking 16 is briefly driven over, for example, in the event of oncoming traffic or on narrow parts of the road 10. If this happens in the case of a particularly narrow second transportation vehicle, the motion trajectory provided by this second transportation vehicle runs relatively close to the outer roadway marking 16. If this motion trajectory is used in connection with the swarm data to determine the guidance trajectory 20, the risk could arise that the first transportation vehicle 18 drives over the outer roadway marking 16 if the first transportation vehicle 18 is significantly wider than the second transportation vehicle providing the motion trajectory. The following possible solutions exist for this problem. On one hand, only the motion trajectories in which the second transportation vehicle has not actively driven over a known line can be provided by the second transportation vehicle for the electronic computing device. The motion trajectory is therefore uploaded from the second transportation vehicle to the electronic computing device only if the determined distance between the respective motion trajectory and the determined roadway edge is greater than or equal to the predefined limit value. A parameter stored in the camera device, in particular, the distance-to-line parameter, can be used for this purpose.

Alternatively or additionally, the swarm data can be cleansed in the electronic computing device and therefore in the backend to solve this problem. The second transportation vehicles essentially also upload their respective vehicle widths for their motion trajectories. A tolerance of the travelled motion trajectories based on the vehicle geometries of the second transportation vehicles, in particular, the vehicle widths, is therefore known. Here, the tolerance describes a difference between half the vehicle widths of the second transportation vehicles themselves or of the second transportation vehicles and the first transportation vehicle 18. The swarm data can be subdivided into classes and stored depending on the respective assigned vehicle widths. Alternatively or additionally, the respective motion trajectories can be corrected in the electronic computing device using this information relating to an average or maximum vehicle width of the respective second transportation vehicles providing the motion trajectories.

Alternatively or additionally, the guidance trajectory 20 can be corrected during its use in the first transportation vehicle 18 to solve the problem. The guidance trajectory 20 can be received by the first transportation vehicle 18 from the electronic computing device for this purpose. If it is determined that the distance between the guidance trajectory 20 and the roadway edge is less than half the vehicle width of the first transportation vehicle 18, the guidance trajectory can then be shifted by a predefined value. Alternatively or additionally, the vehicle widths of the second transportation vehicles, the motion trajectories of which have been used to determine the guidance trajectory 20, can be received by the first transportation vehicle 18 in addition to the guidance trajectory 20. The vehicle width of the first transportation vehicle 18 can further be compared with the received vehicle widths of the second transportation vehicles, and the value by which the guidance trajectory is to be shifted can be determined depending on a result of the comparison. If, for example, the second transportation vehicles providing the motion trajectories have a vehicle width of 1.90 m, whereas the first transportation vehicle 18 has a vehicle width of 2.0 m, the first transportation vehicle 18 is in each case 5 cm wider on both sides in comparison with the second transportation vehicles. The receiving motion trajectory 20 is consequently shifted by 5 cm, in particular, away from an outer roadway edge and toward a center of the road 10. The guidance trajectory 20 is therefore corrected to prevent the determined roadway from being driven over when the guidance trajectory 20 is used to control the first transportation vehicle 18.

On the whole, the disclosed embodiments show how a method for controlling and analyzing the data generation of swarm data in the vehicle, in particular, in a transportation vehicle can be performed.

REFERENCE SIGN LIST

10 Road
12 First roadway
14 Second roadway
16 Roadway marking
18 First transportation vehicle
20 Guidance trajectory
22 Control device
V1-V3 Respective method operations

The invention claimed is:

1. A method for creating a guidance trajectory for a first transportation vehicle, the method comprising:
receiving swarm data for a route section, that represents motion trajectories from a plurality of second transportation vehicles travelling through the route section, wherein the swarm data also includes respective vehicle widths for each of the plurality of second transportation vehicles sending their motion trajectories;
determining distances between the trajectories represented by the swarm data and a determined roadway edge for the route section; and
correcting respective motion trajectories, in an electronic computing device using information based on vehicle width of the respective second transportation vehicles providing the motion trajectories;
determining, by the electronic computing device, the guidance trajectory for the first transportation vehicle using corrected motion trajectories in response to the distance assigned to the respective motion trajectory for the route section being greater than or equal to a predefined limit value;
providing, by the electronic computing device, the guidance trajectory for the first transportation vehicle to a control device of the first transportation vehicle; and
guiding, by the control device, the first transportation vehicle along the guidance trajectory while transversely controlling the first transportation vehicle using the provided guidance trajectory so as to take into consideration the corrected motion trajectories that account for vehicle width of the respective second transportation vehicles providing the motion trajectory.

2. The method of claim 1, further comprising determining the predefined limit value based on a vehicle width of the second transportation vehicle providing the motion trajectory.

3. The method of claim 1, wherein the swarm data for the route section are received by the electronic computing device and the method further comprises discarding motion trajectories for which the distance is less than the predefined limit value.

4. The method of claim 1, wherein the electronic computing device receives the route of a vehicle center of the second transportation vehicles to the determined roadway edge and a vehicle width of the second transportation vehicles from the second transportation vehicles in addition to the determined motion trajectories, and the method further comprises determining, by the electronic computing device, the predefined limit value based on the vehicle width of the second transportation vehicle providing the motion trajectory.

5. The method of claim 1, further comprising classifying received motion trajectories by the electronic computing device based on a vehicle width of the second transportation vehicle, which provides the respective motion trajectory, wherein the vehicle width is assigned to the respective motion trajectory.

6. The method of claim 5, wherein the guidance trajectory is determined by the electronic computing device based on at least one motion trajectory which is assigned to the same classification as the vehicle width of the first transportation vehicle.

7. The method of claim 1, wherein the guidance trajectory is determined from the at least one motion trajectory by the electronic computing device superordinated to the first transportation vehicle and to the at least one second transportation vehicle.

8. The method of claim 1, wherein the motion trajectories are made available for the electronic computing device by the second transportation vehicles for the route section in response to the determined distance being greater than or equal to the predefined limit value, and wherein the motion trajectories for the route section are not provided for the electronic computing device in response to the determined distance being less than the predefined limit value.

9. The method of claim 8, wherein the roadway edge and the distance are determined by a camera device of the second transportation vehicle.

10. The method of claim 1, wherein a distance between the guidance trajectory and a roadway edge is determined by the control device, and, in response to the distance falling below a threshold value, the guidance trajectory is shifted by a predefined value.

11. The method of claim 10, wherein the predefined value is determined by the control device based on a difference between a vehicle width of the first transportation vehicle and a vehicle width of the second transportation vehicle providing the motion trajectory.

12. The method of claim 10, wherein the correction shifts the guidance trajectory away from the roadway edge by a predefined value.

13. A method for operating a transportation vehicle, the method comprising:
determining a distance between a motion trajectory of the transportation vehicle;
determining a roadway edge for a route section in response to the distance being greater than or equal to a predefined limit value for the route section, providing the motion trajectory for the route section to an electronic computing device as swarm data for the route section that represents the motion trajectory and includes the respective vehicle width for the transportation vehicle sending the swarm data; and
correcting the motion trajectory, in an electronic computing device using information based on vehicle width of the transportation vehicle providing the motion trajectory;

determining, by the electronic computing device, a guidance trajectory, for a further transportation vehicle, based on the corrected motion trajectory in response to the distance assigned to the respective motion trajectory for the route section being greater than or equal to a predefined limit value;

providing, by the electronic computing device, the determined guidance trajectory to a control device of the further transportation vehicle for use in transversely controlling the further transportation vehicle using the provided guidance trajectory; and guiding, by the control device, the further transportation vehicle along the guidance trajectory while transversely controlling the first transportation vehicle using the provided guidance trajectory so as to take into consideration the corrected motion trajectory that account for vehicle width of the transportation vehicle providing the motion trajectory.

* * * * *